US007116786B2

(12) United States Patent
McKibben et al.

(10) Patent No.: US 7,116,786 B2
(45) Date of Patent: Oct. 3, 2006

(54) INTERCEPTION OF SECURE DATA IN A MOBILE NETWORK

(75) Inventors: Bernerd R. McKibben, Gilbert, AZ (US); Erwin P. Comer, Queen Creek, AZ (US); William Turner Scott, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 846 days.

(21) Appl. No.: 09/950,130

(22) Filed: Sep. 10, 2001

(65) Prior Publication Data

US 2003/0051158 A1 Mar. 13, 2003

(51) Int. Cl.
*H04L 9/00* (2006.01)

(52) U.S. Cl. ........................ 380/286; 380/247; 380/270

(58) Field of Classification Search ......... 380/277–286
See application file for complete search history.

(56) References Cited

U.S. PATENT DOCUMENTS 5,815,573 A * 9/1998 Johnson et al. ............. 380/286
5,838,792 A * 11/1998 Ganesan ...................... 380/282
6,122,499 A * 9/2000 Magnusson .................. 455/405
6,654,589 B1 * 11/2003 Haumont .................. 455/67.11
6,711,689 B1 * 3/2004 Lumme et al. ............. 713/201
6,738,902 B1 * 5/2004 Ruppert et al. ............. 713/162
6,823,185 B1 * 11/2004 Comer et al. ............... 455/427
2001/0050990 A1 * 12/2001 Sudia ......................... 380/286

OTHER PUBLICATIONS

Security Architecture—3G TS 33.102 version 3.1.0, Jul. 1999, 3rd Generation Partnership Project, Downloaded from the Internet on Mar. 14, 2005 <URL: http://www.3gpp.org/ftp/Specs/archive/33_series/33.102/>.*

ETSI TS 101 331 V1.1.1—Requirements of Law Enforcement Agencies, Aug. 2001, European Telecommunications Standards Institute, Retrieved from the Internet on Mar. 14, 2005 <URL: http://www.gliif.org/LI_standards/ts_101331v010101p_lea-requirements.pdf>.*

ETSI TS 133 106 V4.0.0—Lawful Interception Requirements, Jan. 2000, European Telecom. Standards Institute, Retrieved from the Internet on Mar. 14, 2005 <URL: http://eu.sabotage.org/www/ETSI_surveillance_standards/2000_01_ETSI_TS_133_106%20V3.1.0_UMTS.pdf>.*

"EISI TS 133 106 V4.0.0 (Mar. 2001), Universal Mobile Telecommunications System (UMTS); 3G Security; Lawful Interception Requirements", Mar. 2001, European Telecommunications Standards Institute, Retrieved from the Internet on Jul. 24, 2006 <URL: http://eu.sabotage.org/www/ETSI_surveillance_standards/2001_03_ETSI_TS_133_106_v4.0.0_umts_requirements.pdf>.*

* cited by examiner

*Primary Examiner*—Gilberto Barrón, Jr.
*Assistant Examiner*—Minh Dinh
(74) *Attorney, Agent, or Firm*—Frank J. Bogacz; Kevin D. Wills

(57) ABSTRACT

A method for interception of encrypted end-to-end (12, 14) communication data stores encryption keys (42, 44) of secure communication users. Upon intercept activation (47) a decrypt function (20) provides plain text data to an authorized appropriate law agency (30).

6 Claims, 1 Drawing Sheet

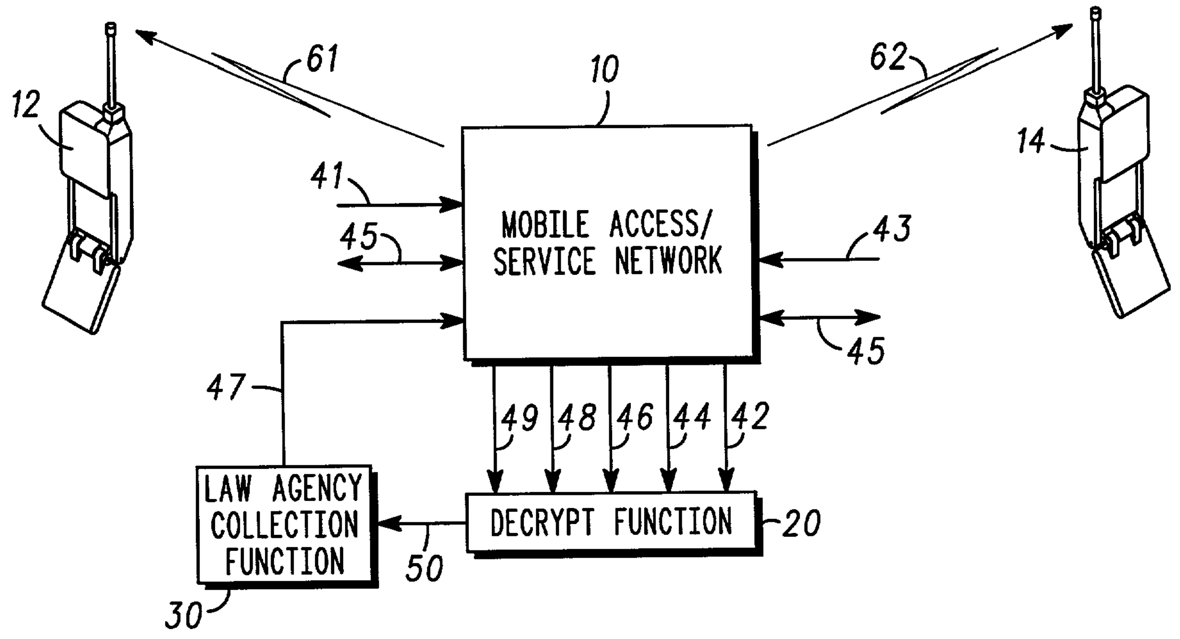
61
62
10
12
14
MOBILE ACCESS/
SERVICE NETWORK
41
45
43
45
47
49
48
46
44
42
LAW AGENCY
COLLECTION
FUNCTION
DECRYPT FUNCTION
20
50
30

INTERCEPTION OF SECURE DATA IN A MOBILE NETWORK

FIELD OF THE INVENTION

The present invention pertains to communication networks and more particularly to interception of secure data in these communication networks.

Generally, law enforcement agencies worldwide require that network operators provide the capability to deliver intercepted communications to the law agency free of any network induced or enabling coding or encryption (plain text). Present networks allow either end-to-end encryption and encoding transparently without the network's knowledge, or application of encoding or encryption directly within the network. Currently, end-to-end encryption and encoding are applied transparently to the network and not required to be removed by the network.

Recent advances in network design allow the network to set up and maintain end-to-end encryption for subscribers.

Since an operator assists the set up of a secure link with encryption, the operator is able to provide interception of such service in "plain text", even if an interception order arrives after the secure session is established.

Therefore, what is needed is for the network operator to be able to decrypt or decode an ongoing secure communication where the encryption is applied by the end user.

BRIEF DESCRIPTION OF THE DRAWING

The single drawing FIGURE is a block diagram of a method for decrypting a secure data communication in accordance with the present invention.

DESCRIPTION OF THE PREFERRED EMBODIMENT

Referring to the drawing FIGURE, a methodology for interception of encrypted data in a communication network is shown. Encryption variables unique to a user end device or subscription are stored as part of the network's device or subscriber profile. In the case of a UMTS system, the mobile's IMEI or IMSI could be used as an encryption variable seed. However, a security specific variable could be added to the subscriber profile. Mobile user 12 is attempting to place a call or data transfer to another mobile user 14 through mobile access/service network 10. Mobile end user or device 12 transmits a session request along with a key transfer 41. Keys which are managed by the network in the session establishment as stored by the network for the duration of the secure communication. In UMTS for example, the CSCF assigned to the target can detect and store the keys used to establish the secure communication.

Since the mobile access/service network 10 has been marked to intercept mobile user 12, copies of target keys and subscription/equipment based encryption variables are sent 42 to decrypt function 20. Mobile access/service network 10 sets up a link between the called user 14 and as a result, the communication session is accepted by called party 14 and user 14 transfers 43 its key to mobile access/service network 10. This initial state of the secure communication session is stored so that the network 10 knows the starting point of the pseudo-random sequence used to create the ciphered text exchanged between mobile users 12 and 14. In the case of UMTS for example, the SGSN provides imperceptible intercept of user data. The initial intercepted data from the SGSN can be stored in the network in case an intercept order is not yet activated. If the intercept was activated prior to secure communication session establishment, the intercepted data is forwarded immediately to a network decrypt function 20 to synchronize the network decryption functions for the communication session.

Mobile access/service network 10 then transmits 44 copies of called party's 14 keys and subscription/equipment based encryption variables to decrypt function 20 for storage.

Next, the secure communication session is established 45 between calling party (end user) 12 and called party (end user) 14. Data then freely flows between end users 12 and 14.

As parties 12 and 14 begin the transfer of data, mobile access/service network 10 determines the initial condition of pseudo random (PN) code applied by user 12 and transfers this information 46 to decrypt function 20 for storage.

Since end user 12 has been selected as a user to be intercepted by a valid law enforcement agency, law agency collection function 30 next issues an intercept order 47 for activating the intercept of end user 12. The intercept activation order 47 is transmitted from law agency collection function 30 to mobile access/service network 10 so that the intercept may proceed.

If the intercept activation order 47 is transmitted to mobile access/service network 10 after the secure communication session has been established between users 12 and 14, network 10 transmits 48 the data volume which has occurred since the communication session has been established to decrypt function 20 in order to synchronize the network 10 to the users 12 pseudo random generator. Once the network 10 has been synchronized to the user 12 pseudo random generator, all the encrypted communication data between users 12 and 14 is intercepted by network 10. Then network 10 transmits 49 this encrypted data to decrypt function 20 for decryption. Next, decrypt function 20 determines the current state of the PN sequence used by users 12 and 14. Using the current PN sequence, the transmitted data is decrypted by decrypt function 20.

When data is decrypted it becomes "plain text", that is readable and understandable by anyone. When decrypt function 20 is synchronized to the PN sequence of users 12 and 14, decrypted data or "plain text" data is produced by decrypt function 20. The "plain text" data is then transmitted 50 to the law agency collection function 30 for use by the appropriate law enforcement agency. Decrypt function may be contained within network 10 itself or located within the law agency requesting the information. Or in an intermediate network (not shown) between network 10 and law agency collection function 30.

In a case where intercept activation order 47 is in place prior to the establishment of the secure communication session between users 12 and 14, then network 10 is not required to transmit 48 the traffic volume since the secure communication has been established. Step 48 may be omitted since the call was begun after the intercept activation order 47 was in place within the network 10.

In an alternate embodiment, steps 48 and 46 may be omitted. In place of steps 46 and 48, the network 10 may transmit requests 61 and 62 to users 12 and 14 respectively to resynchronize their encryption of communication data. In this manner, intercept activation order 47 is already in place when the encrypted data is transmitted between end users 12 and 14. The decrypt function 20 may then easily detect the current state of the PN code used for data encryption by the users. This scenario places a further restriction on the end users in that they must resynchronize their encrypted communication upon command of the network 10.

Although the explanation of the present invention has been explained in the context of law enforcement intercept, the methodology may also be used for quality monitoring and a seamless security transition from a two-way session to a three-way session.

As can be seen from the above explanation, the present invention allows operators of networks to remove network provided end to end encryption of data communication.

Law enforcement agencies are able to maintain effective interception of data as communication networks migrate from 2 G and from 2.5 G to 3 G networks. Most importantly, this invention provides for the interception of end-to-end secure communication data and providing the equivalent plain text version to the appropriate authorized law enforcement agency.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A method for interception in a secure communication system, the method comprising the steps of:

providing, by a network a first key to a first user;

providing by a network a second key to a second user, thereby establishing communication between the first user and the second user;

transmitting encrypted data from the first user to the second user;

storing, by the secure communication system, the first key, the second key and an initial condition of a PN code in a decrypt function;

storing, by the secure communication system, the encrypted data produced subsequent to the establishment of the communication between the first user and the second user;

receiving, by the secure communication system an intercept activation request for the first user subsequent to the establishment of communication between the first user and the second user;

receiving, by the decrypt function the encrypted data since establishment of communication between the first user and the second user;

receiving, by the decrypt function, a data volume of the encrypted data which has occurred since establishment of communication between the first user and the second user and prior to the intercept request; and decrypting the encrypted data to plain text data by the decrypt function using the first and second keys, the initial condition of the PN code and the data volume, wherein the data volume is used to synchronize the network with a pseudo random number generator.

2. A method for interception as claimed in claim 1, wherein there is further included the step of transmitting the plain text data from the secure communication system to a law agency collection function.

3. A method for interception as claimed in claim 1, wherein the step of transmitting includes the step of establishing a link from the first user to the second user through the secure communication system.

4. A method for interception as claimed in claim 1, wherein the secure communication system is a mobile secure communication system.

5. In a universal mobile telecommunication system (UMTS), a method for interception comprising the steps of:

transmitting, by the UMTS a first key to a first user;

transmitting, by the UMTS a second key to a second user, thereby establishing communication between the first user and the second user;

transmitting encrypted data from the first user to the second user;

storing, by the secure communication system, the first key, the second key and an initial condition of a PN code of the first user in a decrypt function;

storing, by the secure communication system, the encrypted data produced subsequent to the establishment of the communication between the first user and the second user;

receiving, by the secure communication system an intercept activation request for the first user subsequent to the establishment of communication between the first user and the second user;

receiving, by the decrypt function the encrypted data since establishment of communication between the first user and the second user;

receiving, by the decrypt function a data volume of the encrypted data which has occurred since establishment of communication between the first user and the second user and prior to the intercept request; and decrypting, by the decrypt function the encrypted data to produce plain text data using the first and second keys, the initial condition of the PN code, and the data volume, wherein the data volume is used to synchronize the network with a pseudo random number generator.

6. In a universal mobile telecommunication system, the method for interception as claimed in claim 5, wherein there is further included the step of transmitting the plain text data from the decrypt function to a law agency collection function.

* * * * *